(12) United States Patent
P et al.

(10) Patent No.: US 7,840,725 B2
(45) Date of Patent: Nov. 23, 2010

(54) CAPTURE OF DATA IN A COMPUTER NETWORK

(75) Inventors: Jayalakshmi P, Bangalore (IN); Mohan Parthasarathy, Bangalore (IN); Subbarao V R N, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1033 days.

(21) Appl. No.: 10/953,207

(22) Filed: Sep. 28, 2004

(65) Prior Publication Data

US 2006/0069821 A1 Mar. 30, 2006

(51) Int. Cl.
*G06F 13/12* (2006.01)
*G06F 3/00* (2006.01)
*G06F 13/36* (2006.01)

(52) U.S. Cl. .............................. 710/56; 710/52; 710/57; 710/310

(58) Field of Classification Search ................... 710/56, 710/52, 57, 310
See application file for complete search history.

(56) References Cited

U.S. PATENT DOCUMENTS 7,401,093 B1 * 7/2008 Hamilton et al. ............ 707/102
2002/0002642 A1 * 1/2002 Tyson et al. ................... 710/65

* cited by examiner

*Primary Examiner*—Niketa I Patel

(57) ABSTRACT

The invention relates to packet tracing in computer networks. Data packets are captured when entering or exiting the network or at any point within the network protocol stack. Buffers in computer kernel space memory store the packets until the contents of the buffers are written to persistent memory. Each buffer holds one or more data packets and the contents of a buffer are written to persistent memory when a status flag associated with the buffer indicates that it may hold no further packets. Data packets may be continuously captured, or capture may be initiated and/or terminated in response to a special event.

52 Claims, 18 Drawing Sheets

CAPTURE OF DATA IN A COMPUTER NETWORK

FIELD OF INVENTION

This invention relates to the capture of data in computer networks by packet tracing systems. In particular the invention relates to the capture of packets of data in high speed computer networks.

BACKGROUND

For many tasks such as testing and improvement of network performance, testing, development and improvement of network protocols and debugging problems related to connectivity, performance and protocol issues, it is necessary to capture the data passing through a computer network for later analysis. This general technique is known as packet tracing.

Data transmitted over a computer network is generated at a first node in a network and is received at a second node in the network. After being generated by an application at the first node the data is not usually in a form suitable for transmission over the network. The generated data usually therefore passes through a series of network modules, known as layers of a protocol stack. Each series of network module alters the form of the data, from the form in which it was generated, to a form suitable for transmission over the network. At the second node, the transmitted data is again altered by network modules, from the form in which it was transmitted, to a form suitable for receipt by an application at the second node.

Data is transmitted over a computer network as a series of discrete packets. Capture of data is affected by intercepting the packets as they move from the generating application at the first node to the receiving application at the second node, and recording the data contained in the packets.

Methods are known for capturing data in the form in which it is transmitted over the network, that is, after the generated data has passed through all network modules at the first node, and before it has passed through any network modules at the second node. However, it is also useful to capture data while it is transmitted between the protocol stack layers.

Known methods of capturing data in the form in which it is transmitted over the network include traffic monitor programs such as tcpdump, developed for use in a UNIX operating system environment, windump, developed for use in a Windows operating system environment, and others similar tools such as snoop and ethereal. These tools capture data at the point between the network modules and the network, that is, the data entering and leaving the network. They are unable to capture the data within the protocol stack. Therefore, they are unable to provide information relating to the operation and performance of the network modules constituting the protocol stack.

A known packet tracing system which is capable of capturing while it is transmitted between the protocol stack layers is the Monitor for Application-Generated Network Traffic (MAGNeT). This system is able to monitor data throughout the series of network modules as well as data entering and leaving the network.

The development of high speed computer networks has given rise to greater quantities of data passing through computer networks at higher speeds. In order to capture this data, it is necessary for packet tracing systems to intercept the data packets and record the relevant data in persistent memory at a sufficient rate, so that data is not lost.

The ability to intercept and record the relevant data in high speed computer networks is limited by the availability and method of use of computer memory and processor resources. In general, packets intercepted by the packet tracing system are firstly placed into memory buffers in non-persistent memory and are secondly transferred from non-persistent memory and written to persistent memory. There is a limited amount of space in the memory buffers in non-persistent memory. If the memory buffers are full of packet data when a further packet is intercepted, data will be lost. Therefore, in order to reduce loss of data, the speed at which data is transferred from non-persistent memory to persistent memory, thereby emptying the memory buffers, so that later packets intercepted can be placed into the buffers, is important.

Known packet tracing systems including tcpdump and MAGNeT place the captured packets into memory buffers. These are implemented in non-persistent memory, in computer operating system kernel space memory. The contents of the buffers are then mapped to user space memory before being written to persistent memory. This mapping to user space memory has several disadvantages. It creates additional demand on system resources, especially processing resources; it introduces overhead time involved for the scheduling of processing resources and memory writes which are requested by the user application; and it introduces the need for a context switch for each memory write call that is made by the user application. These disadvantages result in a higher time taken for data to be written to persistent memory, thereby increasing the potential for loss of data.

The potential for loss of data is further increased in systems such as tcpdump where each packet intercepted by the packet tracing system is dealt with individually. Each time data is copied from memory buffers in kernel space memory to user space memory and each time a memory write request is made by a user application, a fixed amount of overhead time is required, independent of the amount of data being dealt with. Where one packet is copied at a time, this overhead is incurred for each packet, reducing the rate at which the data can be transferred from memory buffers to persistent memory, thereby increasing the potential for loss of data.

The packet tracing system MAGNeT has several features to reduce loss of data. The system uses a fixed size circular buffer in kernel space memory which has a series of slots to each of which a single data packet can be written. MAGNeT also has the ability to aggregate multiple packets and map these in bulk to user space which reduces the overhead time involved in mapping individual packets. However, the reduction in overhead time depends on the frequency with which MAGNeT maps data in user memory space. MAGNeT performs this mapping periodically. If the period Is too short, the number of packets that are aggregated will be less than optimal and therefore the reduction in the overhead time involved in the transfer will also be less than optimal. Conversely, if the period is too long, the buffers in kernel memory will become full, and further intercepted packets will not be able to be stored in the buffers, resulting in loss of data. MAGNeT is unable to ensure that the optimal period will be used.

Yet another challenge for packet tracing systems is the desire to capture only a portion of the data passing through the network. Methods for capturing all data can result in excessive amounts of information, of which only a small portion is needed or is useful for analysis. Thus, the large body of data must be mined to find the relevant information. In many situations, such as the diagnosis of specific network/protocol stack problems, it is useful to be able to capture only the data which is relevant to the specific analysis task. For example, in order to diagnose a specific problem, it may be useful to capture data which has passed through the network immediately before or after the occurrence of the specific problem. In order to achieve this, the user of the packet tracing system may wish to start and stop the capture of data at various times, or may wish for the capture of data to automatically start and stop in response to certain defined events.

Traffic monitor programs such as tcpdump can be used to restrict the data that is captured to a limited degree. For example, parameters may be set within tcpdump such that only a certain type of data is captured (for example, only data received from a particular computer). However, while the program is running, tcpdump will capture all data specified by the parameters set. There is no capability within tcpdump to begin capturing data in response to a user request or a particular event itself.

Similarly, MAGNeT is unable to record a subset of the data passing through the network. In particular, MAGNeT is unable to record a subset of data in response to a user request or a particular event.

It is an object of the invention to provide a packet tracing system and method for capturing data in a computer network, which overcomes or at least mitigate some of the abovementioned limitations of known packet tracing systems and methods.

It is a further object of the invention to provide improved packet tracing capability in high speed computer networks.

It is a further object of the invention to provide packet tracing in response to a user request or a particular event, in order to capture a portion of data passing through a computer network.

SUMMARY OF INVENTION

In a first aspect of the invention there is provided a method of capturing data in a computer network including the steps of designating a plurality of areas of computer memory as buffers, wherein each of the plurality of buffers has associated therewith a status flag; receiving a data packet; receiving a second data packet; writing the data packets to a buffer; modifying the status flag of the buffer in dependence on the contents of the buffer; monitoring the status flag of the buffer; and writing the contents of the buffer to persistent computer memory in dependence on the status flag of the buffer.

Preferably each buffer is associated with a status flag which indicates whether a data packet may be written to that buffer and which is monitored by a computer operating system kernel daemon. Furthermore it is preferred that each designated area of computer memory to be used as a buffer is contiguous and is contained in an area of computer memory reserved for use by the operating system of a computer. In a preferred embodiment the total size of the plurality of areas of computer memory is adjusted by a computer in dependence on the rate of receipt of data packets.

In a preferred embodiment the data packet received can be received from any computer network module, and be written to a buffer by a computer module which is part of a computer operating system kernel.

It is also preferred that the method includes the step of modifying the status flag of a buffer after the contents of that buffer have been written to persistent computer memory, and that the step of writing the contents of a buffer to persistent memory uses data striping, is performed by a computer operating system kernel daemon, and occurs when the status flag of a buffer indicates that a subsequent data packet may not be written to that buffer. It is preferred that the computer daemon is alerted when the status flag of a buffer is modified to indicate that a data packet may not be written to that buffer In a preferred embodiment one buffer of the plurality of buffers is designated as the current buffer. The preferred method includes the step after receiving a data packet the space available in the current buffer is examined to determine whether it is sufficient to accommodate the data packet received. If the space available in the current buffer is sufficient to accommodate the data packet received, the data packet received is written to the current buffer. Preferably the plurality of buffers forms a predefined sequence of buffers and if the space available in the current buffer is not sufficient to accommodate the data packet received, the data packet is written to the next buffer. Preferably if the space available in the current buffer is not sufficient to accommodate the data packet received, the status flag of the next buffer in the predefined sequence is examined to determine whether the status flag of the buffer indicates that a data packet may be written to the buffer. If the status flag of the next buffer indicates that a data packet may be written to that buffer, the data packet received is written to that buffer, after which the status flag of the current buffer is modified to indicate that a data packet may not be written to that buffer, and the next buffer becomes the current buffer. Furthermore, t is preferred that if the status flag of the buffer after the current buffer in the predefined sequence indicates that a data packet may not be written to that buffer the data packet is written to the current buffer.

Preferably the plurality of buffers form a predefined sequence of buffers, and if the status flag of more than one buffer indicates that for each of the more than one buffers a data packet may not be written to that buffer, the contents of each of the buffers will be written to persistent computer memory in an order following the predefined sequence from the contents of the buffer to which a data packet was least recently written to the contents of the buffer to which a data packet was most recently written.

In an alternative aspect of the invention the contents of a buffer to persistent computer memory occurs in dependence on the status flag of the buffer and in dependence on a request or on a special event. The special event may be related to the nature of a data packet received, a state of the connection to a computer network, or to the state of the networking system.

In a further aspect, the invention provides a computer program adapted to perform the method of the invention.

In a further aspect of the invention, there is provided an apparatus for capturing data in a computer network including dynamic memory having a plurality of areas of memory defining a plurality buffers, wherein each buffer is associated with a status flag; persistent memory; a data processor for receiving a data packet, writing a plurality data packets to a buffer, modifying the status flag of a buffer in dependence on the contents of the buffer, and monitoring the status flag of a buffer, and a computer daemon controlling the data processor to write the contents of a buffer to the persistent memory in dependence on the status flag of the buffer.

In a preferred embodiment the data processor consists of more than one processing unit and the computer daemon is bound to a first processing unit and the first processing unit is not otherwise used for processing network traffic.

Preferably each area of memory defining a buffer is contiguous and is contained in an area of computer memory reserved for use by an operating system of a computer. It is preferred that more than one data packet is written to each area of memory defining a buffer. In a preferred embodiment the data processor can receive a data packet from any computer network module.

In a further preferred embodiment the dynamic memory maintains a reference to a designated buffer. Furthermore, after the data processor receives a data packet the data processor performs the function of examining the space available in the designated buffer to determine whether it is sufficient to accommodate the data packet received and if the space available in the designated buffer is sufficient to accommodate the data packet received, the data processor performs the function of writing the data packet received to the designated buffer, however if the space available in the designated buffer is not sufficient to accommodate the data packet received, the data processor performs the function of examining the status flag of the next buffer a predefined sequence of buffers. Preferably if the status flag of the buffer after the designated buffer in the predefined sequence indicates that a data packet may be written to the buffer the data processor performs the function of writing the data packet to the buffer, and modifying the status flag of the designated buffer to indicate that a data packet may not be written to that buffer and modifying the reference in the dynamic memory to designate the next buffer in the predefined sequence. It is furthermore preferred that if the status flag of the buffer after the designated buffer in the predefined sequence Indicates that a data packet may not be written to that buffer the data processor performs the function of writing the data packet to the designated buffer.

In a further preferred embodiment the data processor performs the function of alerting the computer daemon when the status flag of a buffer is modified to indicate that a data packet may not be written to that buffer. Preferably the data processor also performs the function of modifying the status flag of a buffer when the contents of the buffer are written to persistent computer memory. Furthermore, the data processor preferably performs the function of writing the contents of a buffer to persistent memory when the status flag of the buffer indicates that a data packet may not be written to that buffer.

In a preferred embodiment if the status flag of more than one buffer indicates that for each of the more than one buffers a data packet may not be written to that buffer the data processor performs the function of writing the contents of each of the buffers to persistent computer memory in the order of the contents of the buffer to which a data packet was least recently written to the contents of the buffer to which a data packet was most recently written.

In another preferred embodiment the computer daemon controls the data processor to write the contents of a buffer to the persistent memory in dependence on the status flag of the buffer and in dependence on a request or special event. The special event may be related to the nature of a data packet received, a state of the connection to the computer network, or the state of a networking system.

In yet a further aspect there is provided a method of capturing data in a computer network including the steps of designating a plurality of areas of computer memory wherein each area of computer memory is to be used as a buffer, wherein each of the plurality of buffers is associated with a status flag; receiving a data packet; writing the data packet to a buffer; and writing the contents of a buffer to persistent computer memory in response to detection of a special event request.

In a further aspect, the invention provides for a computer network adapted to operate in accordance with the method as hereinbefore defined.

In yet a further aspect, the invention provides for a computer configured to operate in accordance with the method as hereinbefore defined.

BRIEF DESCRIPTION OF DRAWINGS

The invention will now be described by way of non-limiting example and with reference to the accompanying drawings in which.

DETAILED DESCRIPTION OF THE INVENTION

Figure 1:
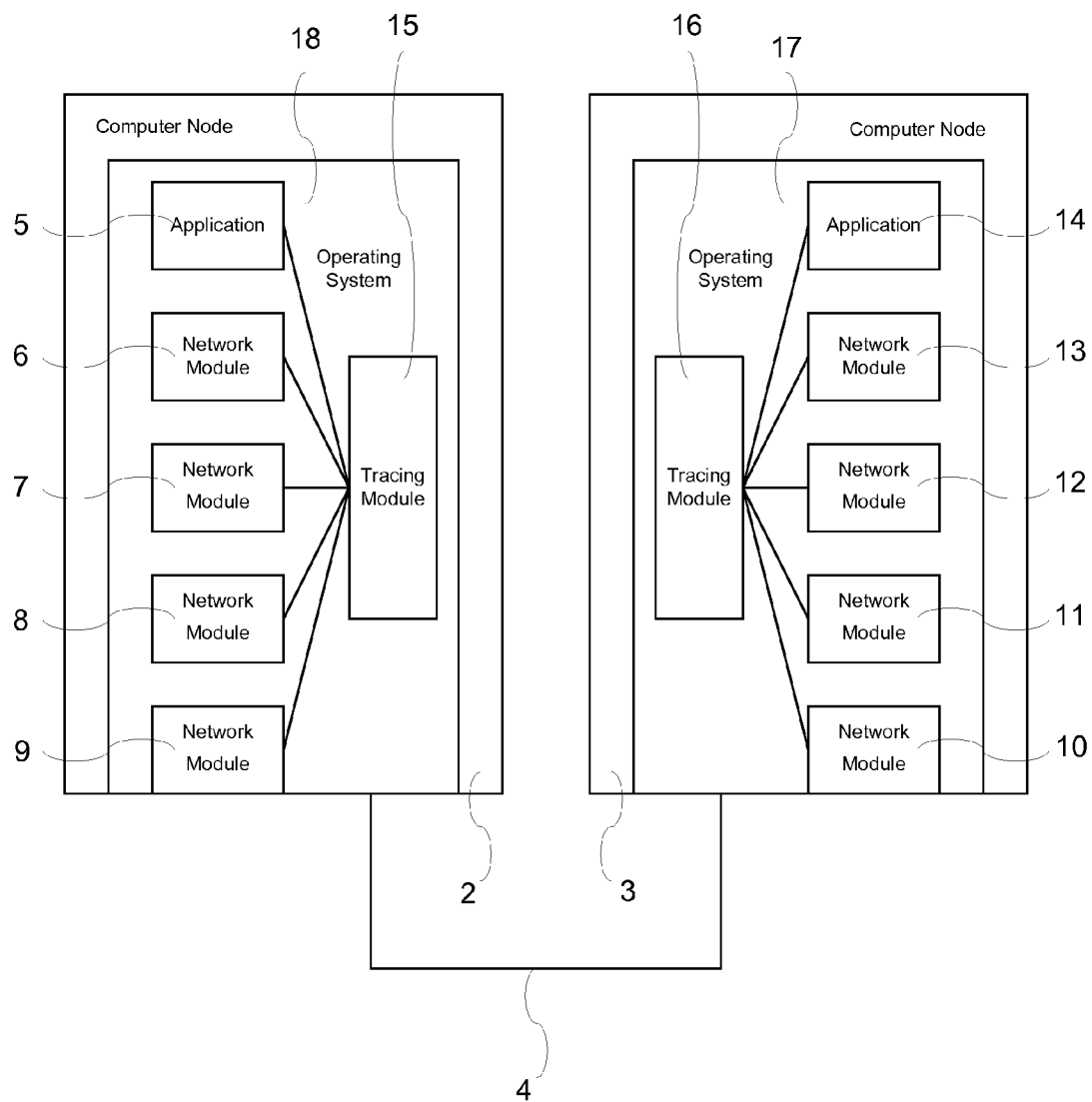
FIG. 1: shows an overview of a computer network.

FIG. 1 shows a simple computer network 1 with two computer nodes 2, 3 and a network connection 4. The invention may form part of the operating system 17, 18 of any computer 2, 3 connected to a computer network. In an example operation of the computer network, data is generated by an application 5 at the first node 2. The data then passes through a series of network modules 6, 7, 8, 9. These network modules form layers of a protocol stack. Each module alters the data in some way, such as creating discrete packets of data or placing headers on the packets of data, to put the data in a form suitable for transmission over the network connection 4. The data is transmitted over the network connection 4 as discrete packets. Once it arrives at the second node 3, the data passes through a series of network modules 10, 11, 12, 13 to put it in a form suitable for receipt by an application 14.

A tracing module 15, 16 is a computer module or computer program which preferably forms part of the kernel of the operating system of the computer on which the invention is operating. The tasks performed by the tracing module are accomplished through use of a data processor. In FIG. 1, the invention operates on a computer 2 and operates independently on another computer 3. For example, network modules 5, 6, 7, 8, 9 on computer 2 can pass packets of data to tracing module 15 and modules 10, 11, 12, 13, 14 on computer 3 pass packets to tracing module 16. As the discrete packets of data pass through the series of network modules, any of the network modules can make a call to the tracing module 15, 16 and pass their data packets to the module. The tracing module can receive a data packet from any network module.

Figure 2:
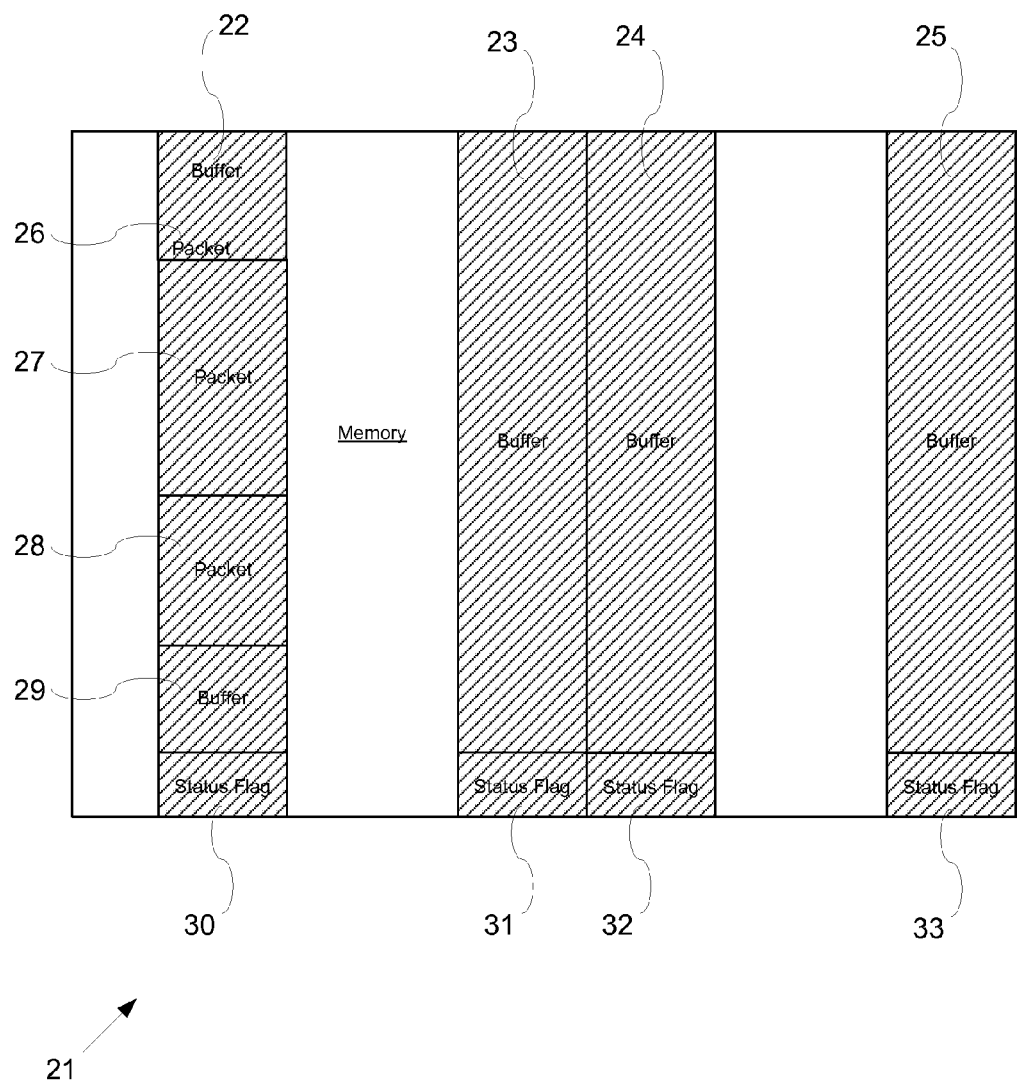
FIG. 2: shows an area of memory showing diagrammatically the allocation of space for buffers.

FIG. 2 shows an area of computer memory 21 reserved for use by the operating system of a computer. This area of memory is also referred to as kernel space memory and is dynamic memory. Within this area of memory there are designated several areas of memory 22, 23, 24, 25. Each designated area is used as a buffer. In a preferred embodiment of the invention, designated areas of memory are contiguous. The purpose of the buffers 22, 23, 24, 25 is to provide intermediate storage for data packets passed to the tracing module from any of the network modules. Each of the buffers is preferably of a fixed size. The data packets to be stored in the buffers may be of variable size. FIG. 2 shows buffer 22 holding 3 packets of variable size 26, 27, 28 with some remaining space available in the buffer 29. A buffer may hold only one data packet if the size of that packet was such that there was not sufficient space remaining in the buffer to hold another data packet. However, typically a buffer will hold many data packets.

Each buffer has also associated therewith at least one status flag 30, 31, 32, 33. In the example discussed, there is only one status flag per buffer. This status flag indicates whether a data packet may be written to that buffer.

The buffers are implemented such that there is a predefined sequence of buffers. For example, the buffers may be implemented in a circular linked structure. However, any suitable predefined sequence may be used. One buffer is designated as the current buffer. This is achieved by the implementation of a computer memory reference held in dynamic memory, referring to a designated area of memory which is being used as a buffer. The current buffer is the buffer to which the tracing module will attempt to write the next data packet received.

When the operation of the tracing module is started, the total amount of memory to be utilised for buffers is set to a default value. It is possible for the initial amount of memory to be utilised for buffers to be specified by the user. It is also possible for the user to specify a maximum amount of memory to be utilised for buffers. In this case, this may be larger than the default or initial specified amount of memory. When the volume of data packets passed to the tracing module is high, the tracing module may dynamically increase the amount of memory to be utilised for buffers. An increase in the amount of memory results in an increase in the number of buffers available to hold data packets. This reduces the amount of data that is likely to be lost due to insufficient space available in the buffers.

Figure 3:
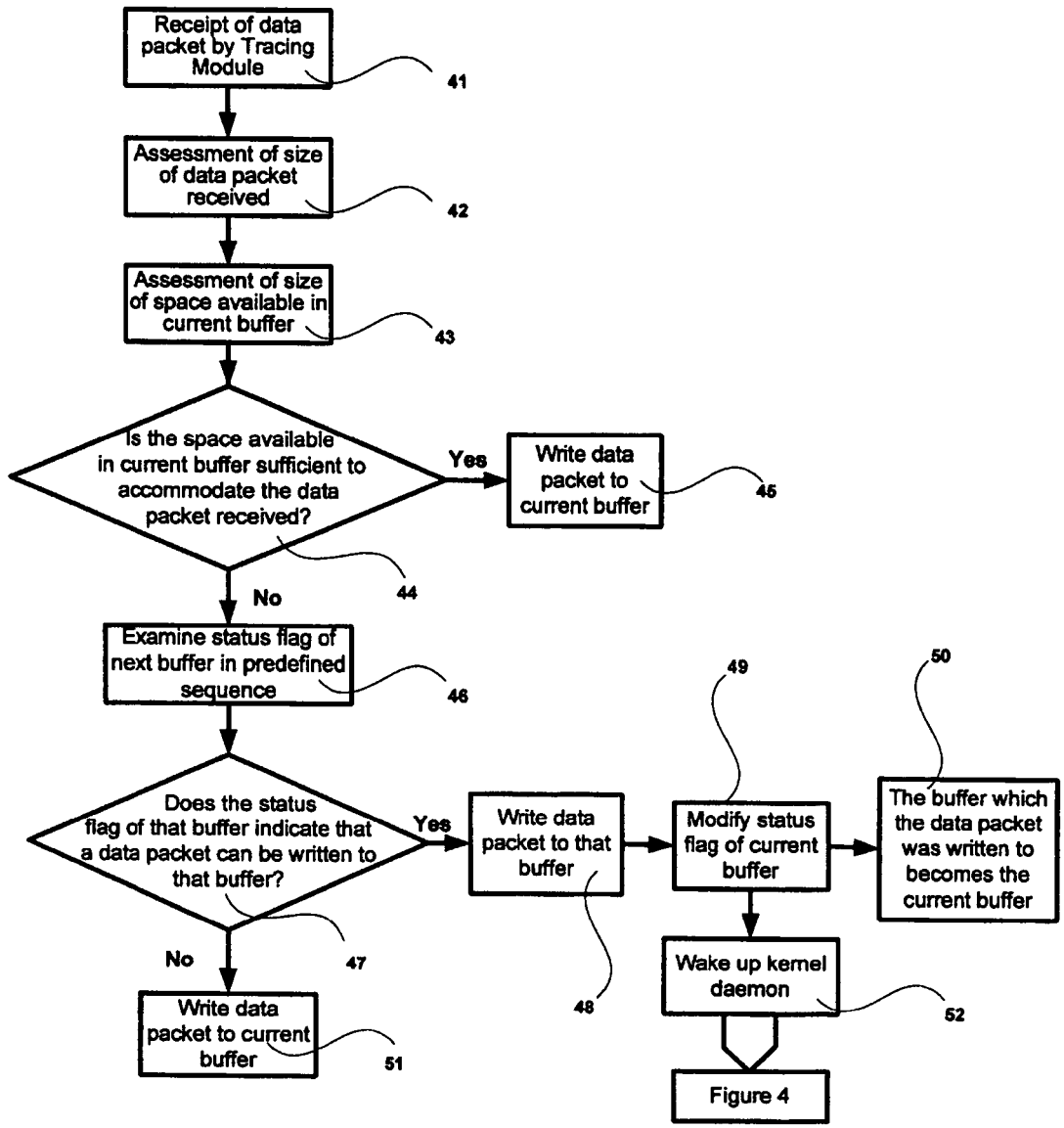
FIG. 3: shows a flow diagram of the operation of the tracing module.

FIG. 3 shows a flow diagram of the steps performed by the tracing module once a data packet is received by the tracing module. Step 41 shows the receipt of a data packet by the tracing module. The data packet is then examined to assess its size 42. Following assessment of the size of the data packet, the tracing module assesses the available space in the current buffer 43. The space available in the current buffer and the size of the data packet received are compared to determine whether or not there is sufficient space in the current buffer to accommodate the received data packet 44. If it is found that there is sufficient space in the current buffer, the data packet is written to the current buffer 45.

However, if it is found that there is insufficient space in the current buffer to accommodate the data packet, the status flag of the next buffer in the predefined sequence of buffers will be examined by the tracing module 46. If that status flag indicates that a data packet may be written to the next buffer 47, the data packet will be so written 48.

The status flag of the current buffer is modified to indicate that a data packet may not be written to that buffer 49. Modification of the status flag will occur regardless of whether some space remains in the current buffer. The tracing module will also designate that the next buffer is to become the current buffer 50. This ensures that the order in which the data packets appear in the buffers, and subsequently in persistent memory, reflects the order in which the data packets were received.

If the current buffer does not have sufficient available space to accommodate a data packet and examination of the status flag of the next buffer indicates that a data packet may not be written to that buffer 47 the data packet will be written to the current buffer 51. The status flag of the next buffer will indicate that a data packet may not be written because the existing contents of the buffer have not yet been written to persistent memory. In this situation, the existing data held in the current buffer is overwritten by the more recent data packet received. Although there may be more than two buffers, the buffer after the current buffer is the buffer which holds the oldest set of data. Therefore, if the contents of that buffer have not yet been written to persistent memory freeing the buffer to be able to hold further data packets, there will be no other buffer which is able to hold further data packets.

When existing data in the current buffer is overwritten with more recently received data some loss of data will occur. The election to lose the data previously held in the current buffer ensures that the current buffer always holds the most recent data.

Figure 4:
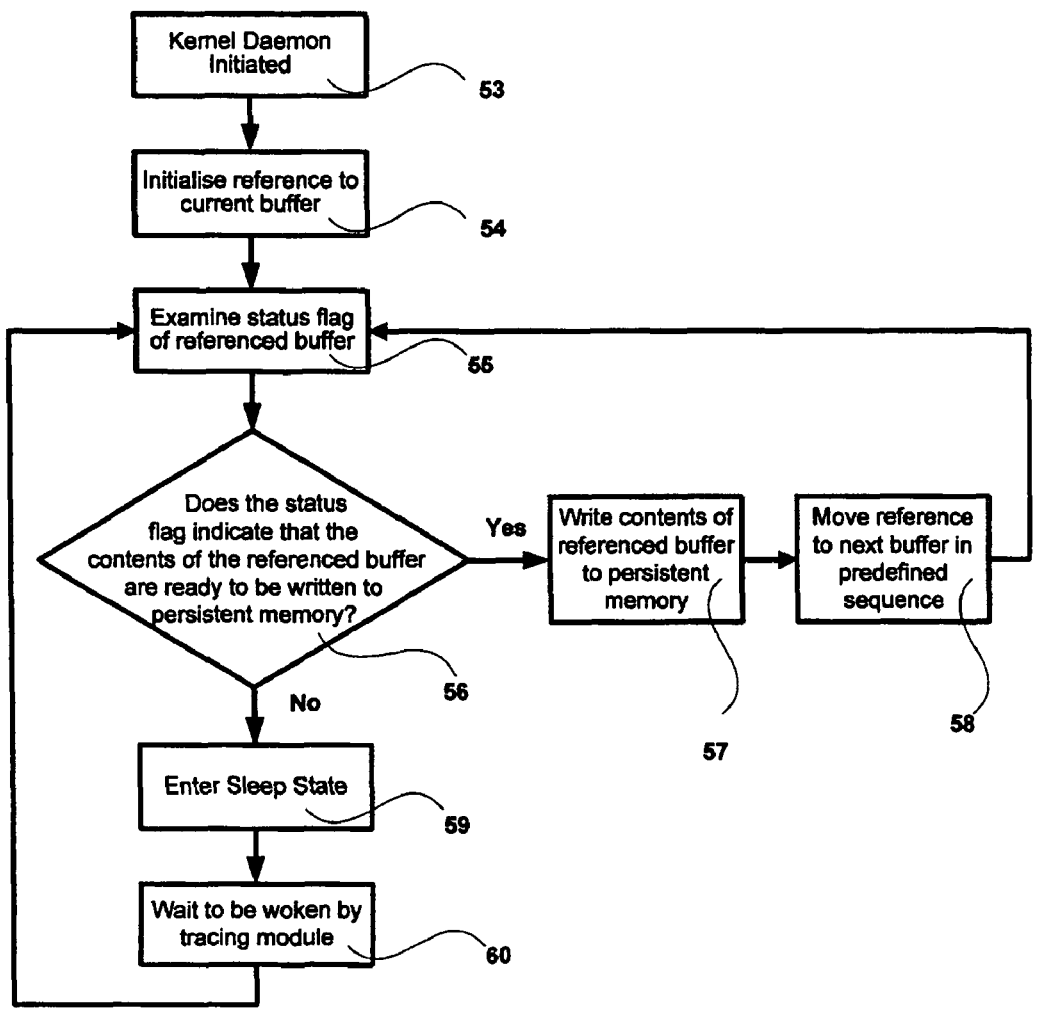
FIG. 4: shows a flow diagram of the operation of the kernel daemon.

Referring to FIG. 4, a computer operating system kernel daemon writes the contents of the buffers to persistent memory. The tasks of the kernel daemon are accomplished by use of a data processor. This daemon is initiated 53 when the packet tracing system is initiated. When initiated the daemon initiates a reference to the next buffer of which the contents are to be written to persistent memory. This is initially set to the current buffer 54. The daemon examines the status flag of the referenced buffer 55 to determine whether a data packet may not be written to that buffer. The status flag indicating this condition not only signifies whether a data packet may be written to that buffer, it is also used to indicate to the daemon that the contents of the buffer are ready to be written to persistent memory. If the contents of the referenced buffer are not ready to be written to persistent memory, the daemon enters a sleep state 59. When in this state, the daemon awaits being woken by the tracing module 60. To this end, referring to FIG. 3, when the status flag of a buffer is modified to indicate that a data packet may not be written to that buffer, the tracing module wakes up the daemon 51. Referring once again to FIG. 4, when woken 60 the daemon examines the status of the referenced buffer 54 and if it finds that the status flag indicates that a data packet may not be written to that buffer 55 it will proceed to so write the contents of that buffer to persistent memory.

Figure 6:
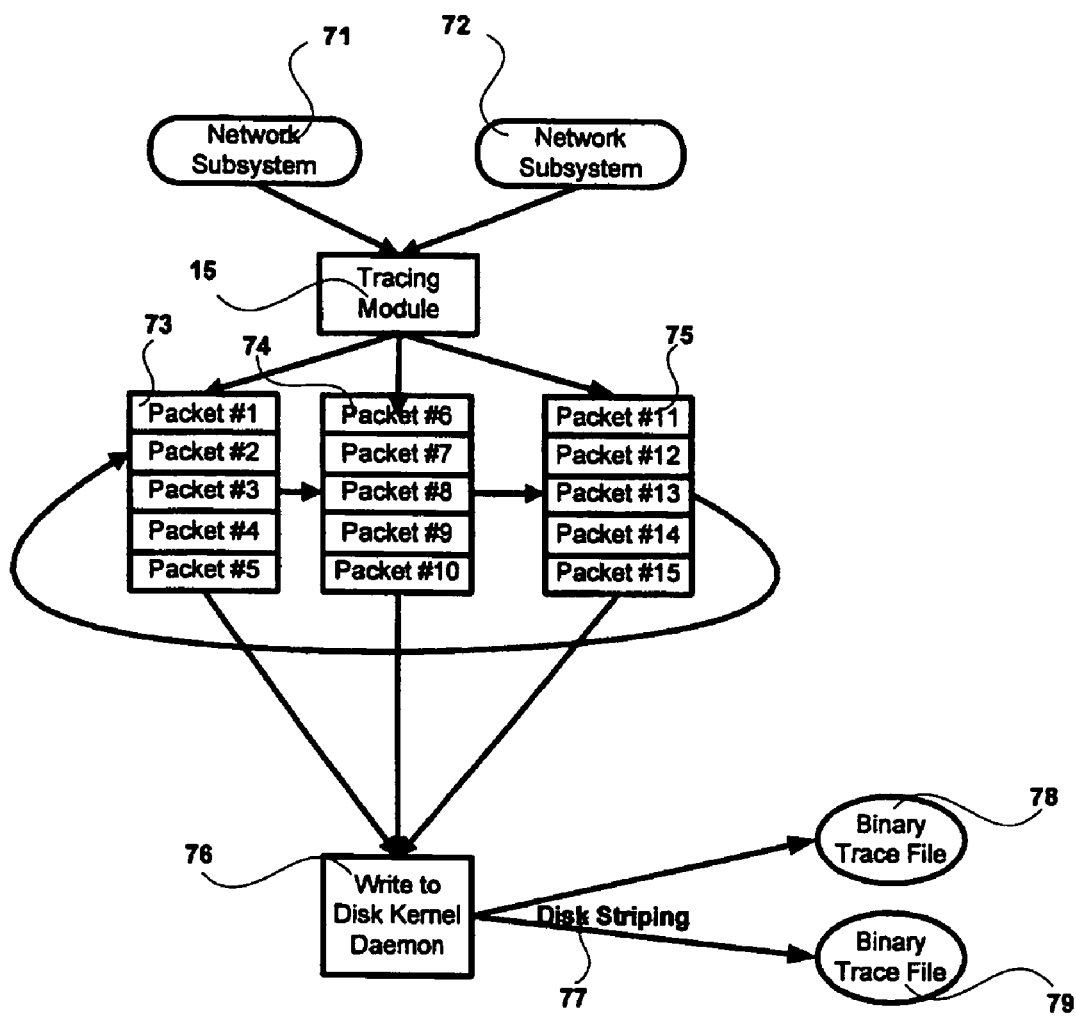
FIG. 6: shows an overview of packet tracing system.

The daemon writes the contents of a buffer directly from the kernel-based buffer to persistent memory. For example, this may be achieved by a write call made by the daemon to a file system. This method of writing the contents of the buffers directly to persistent memory is advantageous over packet tracing systems which write the contents of buffers from user memory space to persistent memory because it eliminates the need for the movement or mapping of data from kernel memory space to user memory space and then to persistent memory. FIG. 6 shows the kernel daemon 76 which is capable of writing the contents of the buffers 73, 74, 75 directly to persistent memory 78, 79.

After writing the contents of the referenced buffer to persistent memory the reference will be moved to the next buffer in the predefined sequence of buffers 57. The status flag of the referenced buffer will be examined 54. If the status flag indicates that the referenced buffer is ready to be written to persistent memory, the daemon will do so. Otherwise the daemon will return to its sleeping state.

Once the contents of a buffer have been written to persistent memory by the computer operating system kernel daemon, the buffer is available to hold further incoming data packets. Therefore, after the contents of a buffer have been written to persistent memory the status flag of the buffer is modified to indicate that a data packet received may be written to that buffer.

As will be understood from the above description, in order to minimise the risk that data will be lost by being overwritten by incoming data packets, it is desirable that once the status flag of a buffer is modified to indicate that further data packets may not be written to that buffer, the daemon writes the contents of the buffer to persistent memory as soon as possible. This makes the buffer once again available to store incoming data packets. Therefore, it is preferable for the daemon to be bound to a specific dedicated processing unit, and for that processing unit not to be otherwise processing network traffic. This reduces time needed to schedule the processing unit for use by the daemon. Thus, the host hardware platform preferably includes more than one processing unit operable in the computer on which the invention is operating.

In order to further reduce the amount of time taken to write the contents of the buffers to persistent memory a disk striping or data striping technique may be employed. This involves the configuration of the physical persistent memory devices to achieve maximum parallelisation when writing the contents of multiple buffers to the same file simultaneously. This reduces some of the delay involved in writing data to persistent computer memory. Details and implementation of general striping techniques will be evident to those skilled in the art and will not be described in detail.

As noted in the background discussion, packet tracing systems involve the continuous tracing of packets passing through the computer network. While this is useful for many applications, it results in the collection of a large amount of data. For tasks such as debugging specific problems in the network system it can be difficult to find, within the large amount of data collected, the data that is relevant to a particular event of interest which has occurred within the system. Furthermore, the collection and writing to persistent memory of data that is not required, results in a waste of computer memory and processing resources. Therefore, a second embodiment of the invention provides the ability to record a snapshot of packet tracing data.

Figure 5:
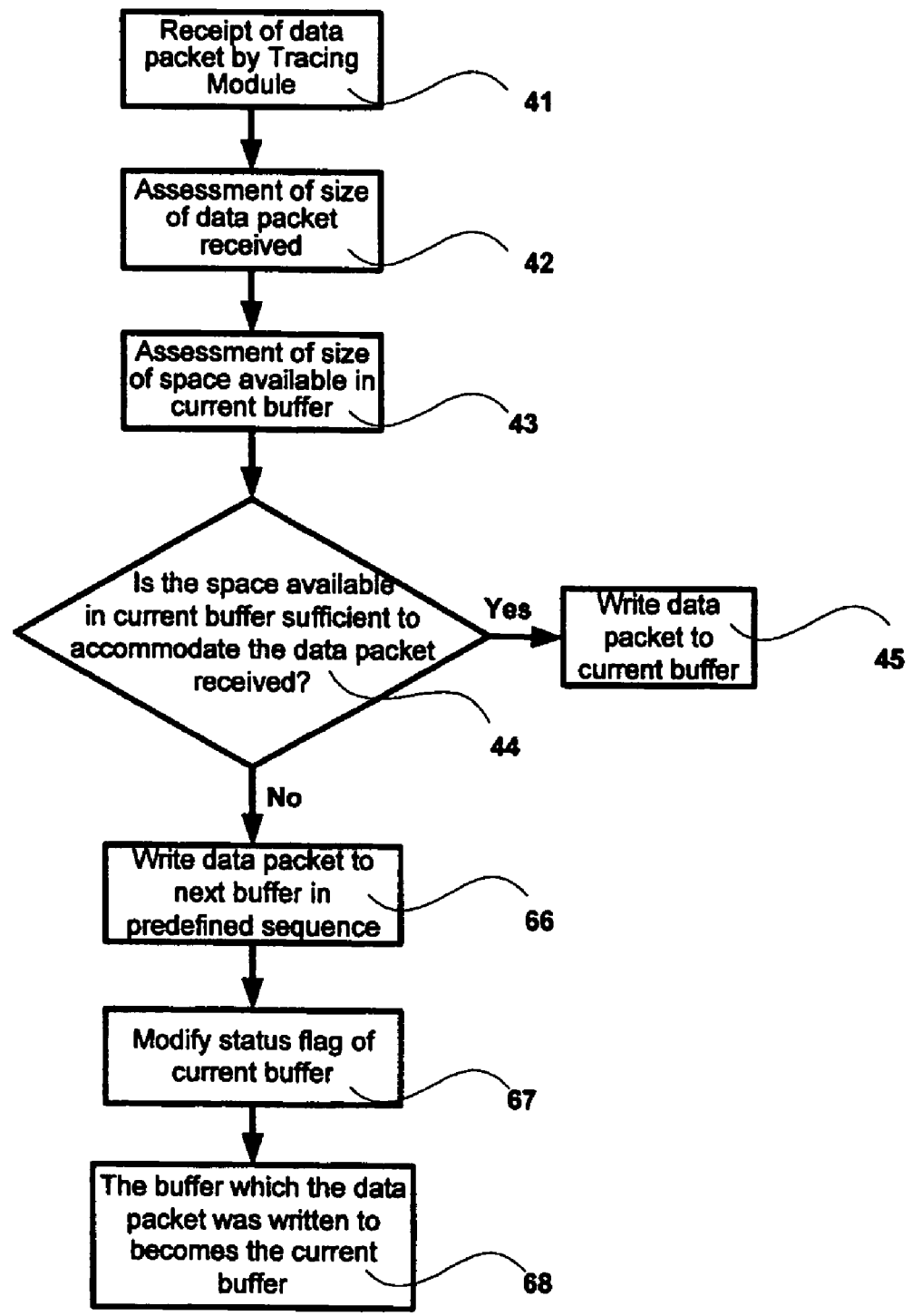
FIG. 5: shows a flow diagram of a variation of the operation of the tracing module.

In the second embodiment the data is not continuously written to persistent memory. Data packets are written to the buffers in substantially the same way as described above. Referring to FIG. 5 steps 41 through 45 are the same as described above with reference to FIG. 3. However, none of the data is written to persistent memory at this time. The kernel daemon goes into and remains in a sleep state after being initiated. The data packets are stored in the buffers in order to ensure that the buffers always hold the most recent set of data. Therefore, when the space available in the current buffer is not sufficient to accommodate an incoming data packet 44 the data packet is written to the next buffer in the predefined sequence 66 as this buffer is the buffer which holds the oldest data. The status flag of the current buffer is modified to Indicate that a data packet may not be written to that buffer 67. The next buffer in the predefined sequence then becomes the current buffer 68, the status flag of that buffer is modified to indicate that data packets may be written to that buffer and the process of storing data packets into the buffers continues.

At the time at which the packet tracing system begins to store data packets in the buffers, the status flag of all buffers will indicate that a data packet may be written to each of the buffers. As each buffer becomes full, the status flag of each buffer will be modified to indicate that a data packet may not be written to that buffer, as described above with reference to FIG. 3. However, once it is established that the space available in the current buffer is not sufficient to accommodate an incoming data packet 44, in the second embodiment of the invention, it is not necessary to check the status flag of the next buffer in the predefined sequence. The data packet is automatically written to the next buffer 66.

According to this embodiment, the data held in the buffers is written to persistent memory in response to a watch event. Such an event may be any event that occurs in the computer system. For example, it may be a user initiated event or user request such as clicking a button, or typing a key. Alternatively it may be an event in the life of the network system such as attaining a specified throughput of network traffic, a state of a network connection, or any other state entered into by the network system. Other examples of events include the occurrence of repeated negative acknowledgements in a TCP network connection, or the receipt of a specified number of packets. The event is a watch event, because the computer daemon which writes the contents of the buffers to persistent memory "watches" for the event.

When such a specified event occurs, the status flag of the current buffer is modified to indicate that no data packets may be written to that buffer. Therefore the status flag of all buffers to which at least some data has been written indicate that no data may be written to that buffer. Thus, no further data packets are able to be recorded in the buffers. The kernel daemon then writes to persistent memory the contents of all buffers for which the status flag indicates that no data packets can be written to that buffer. The contents of each of the buffers are written to persistent memory following the predefined sequence of buffers from the buffer to which a data packet was least recently written to the contents of the buffer to which a data packet was most recently written. Following the occurrence of a watch event, the behaviour of the packet tracing system is dependent on the needs of the user of the system. Data packets received after the occurrence of an event may be lost. Alternatively, data received after the occurrence of an event may be stored in a second set of buffers. Furthermore, after the contents of all buffers, which were full the time of the event, have been written to persistent memory, the operation of the packet tracing system may terminate. Alternatively, the operation of the packet tracing system may continue. If the operation is to continue, the continued operation may be by way of the method shown in FIG. 3, or alternatively by the method shown in FIG. 5, or some combination of such methods.

FIG. 6 shows an overview of the packet tracing system. The two network subsystems 71, 72 pass data packets to the tracing module 15. The tracing module then stores the data packets into the three buffers 73, 74, 75. As can be seen from the directional arrows between the buffers, the buffers are arranged in a circular linked structure which creates a predefined sequence of buffers.

Figure 7:
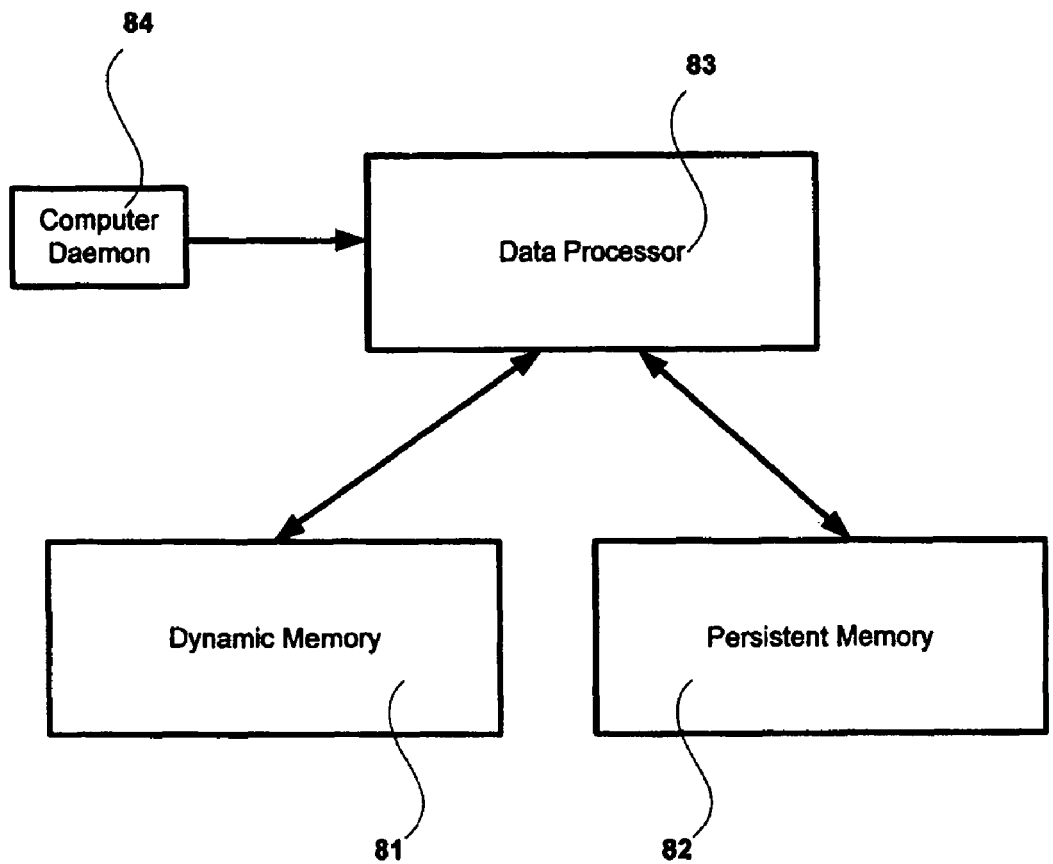
FIG. 7: shows the apparatus of the invention.

FIG. 7 shows an apparatus for implementing one embodiment of the method according to the invention. The apparatus includes dynamic memory 81 such as RAM suitable for maintaining the buffers and the status flag associated with each buffer. The apparatus also includes persistent memory 82 such as a hard disk drive on which is stored the contents of the buffers once the contents are written from the buffers to the persistent memory. The invention uses a data processor 83 which may be any suitable computer processor to perform the tasks completed by the tracing module including receiving a data packet, writing a plurality of data packets to a buffer, modifying the status of a buffer in dependence on the contents of that buffer, and monitoring the status flag of a buffer. A daemon 84 is used to control the data processor to write the contents of a buffer to persistent memory in accordance with the invention.

Figure 8A:
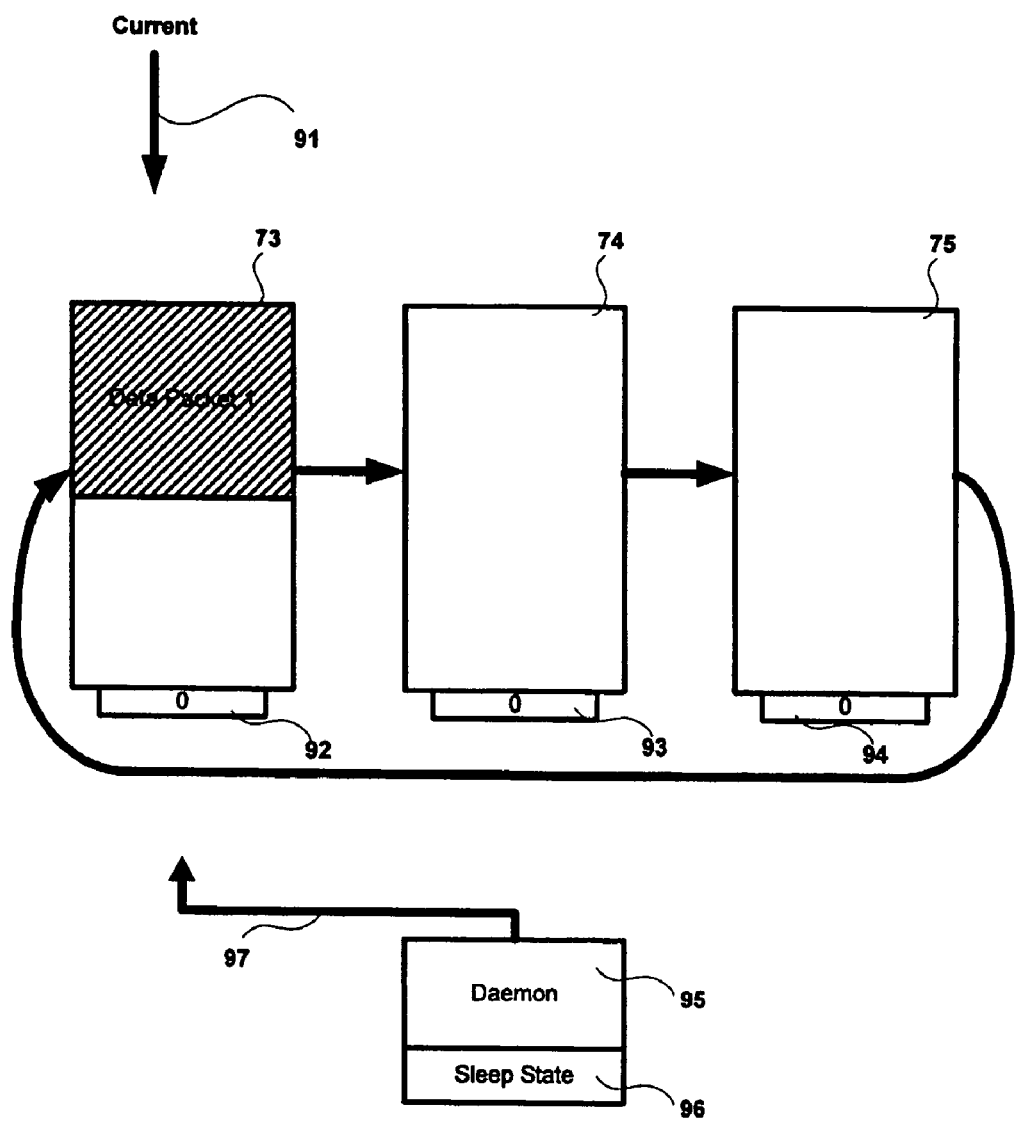
FIGS. 8a-10: show an example series of buffers.

FIG. 8a shows an exemplary conceptual arrangement of the three buffers after the packet tracing system has been initiated and before the first data packet has arrived from a network subsystem 73, 74, 75. The first buffer 73 is designated as the current buffer 91. Each of the buffers has associated therewith a status flag 92, 93, 94 indicating whether a data packet may be written to that buffer. In this example the numeral 0 is used to indicate that a data packet may be written to the associated buffer, and the numeral 1 is used to indicate that a data packet may not be so written. Before the first data packet has arrived, the status flag for each of the buffers is set to indicate that a data packet may be written to each buffer. In this example, all buffers have a size of 500 bytes.

The kernel daemon 95 has initiated a reference 97 to the buffer which will next have its contents written to persistent memory. This reference is initially to the current buffer. Once initiated, the daemon examines the status flag 92 of the referenced buffer 73 to determine whether the contents of the buffer are ready to be written to persistent memory. As the status flag 92 indicates that this is not the case, the kernel daemon will enter a sleep state 96.

When the first data packet arrives, the size of the data packet is assessed and found to be 250 bytes. The current buffer has 500 bytes of available space, therefore, there is sufficient space to accommodate the first data packet.

Figure 8B:
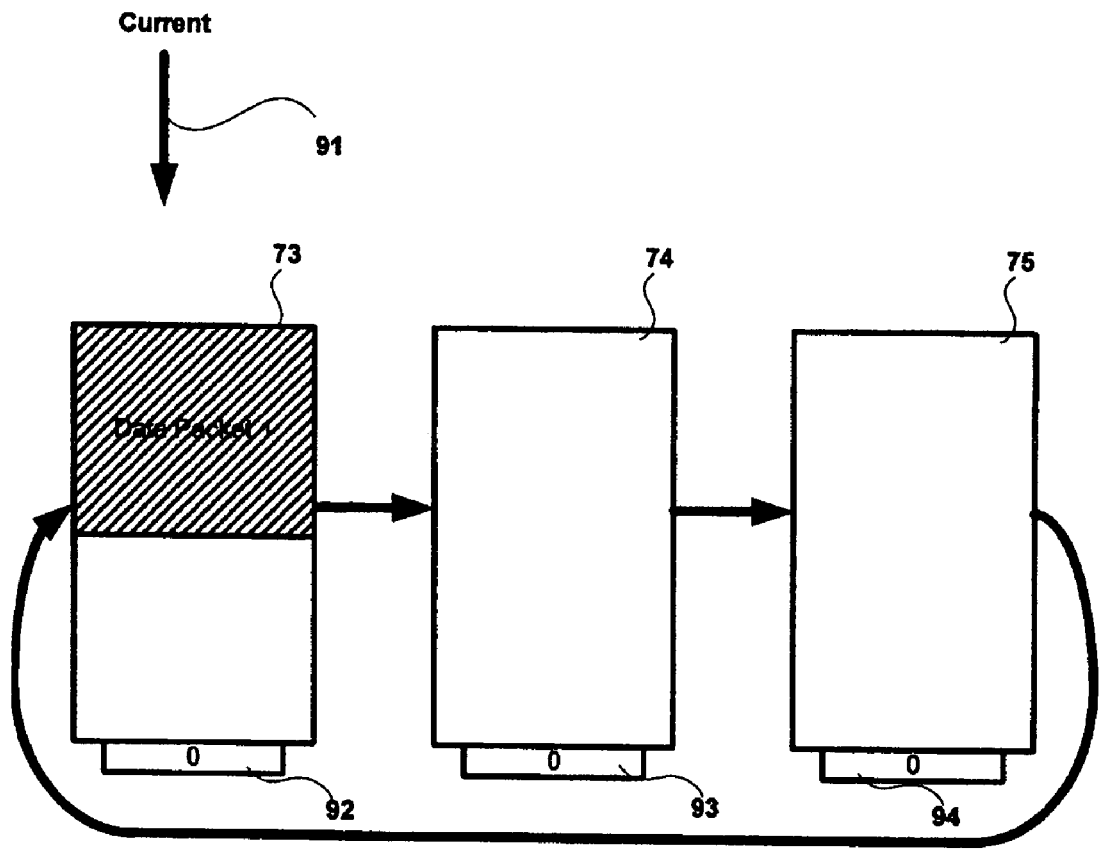

FIG. 8b shows the state of the buffers after the first data packet has been written to the current buffer. The first packet occupies half of the current buffer.

Figure 8C:
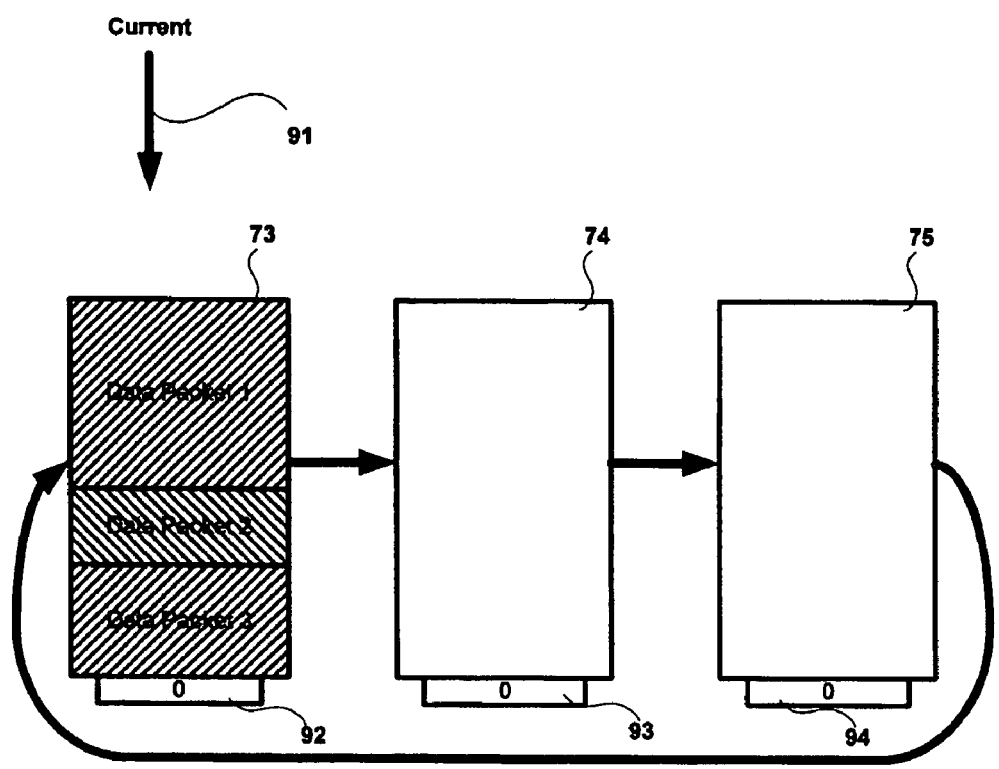

When the second data packet arrives, the size of the data packet is assessed and found to be 100 bytes. The current buffer has 250 bytes of available space, therefore, there is sufficient space to accommodate the second data packet, and it is written to the current buffer 91. A third data packet with a size of 150 bytes matches exactly the remaining 150 bytes of available space in the current buffer. FIG. 8c shows the status of the buffers after the arrival of the third data packet. It is to be noted that, although buffer 73 is completely full of data, it is still the current buffer 91, and the status flag 92 of the buffer still indicates that a data packet can be written to the buffer.

Figure 8D:
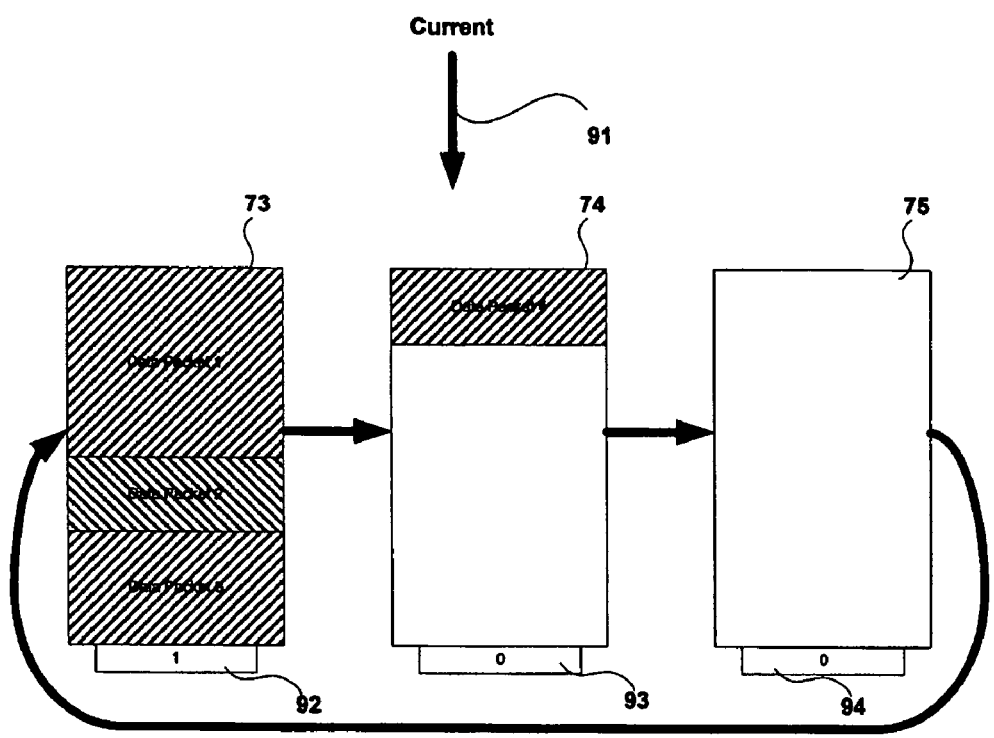

A fourth data packet with a size of 100 bytes arrives. The space available in the current buffer is assessed and found to be 0 bytes, which is insufficient to accommodate a 100 byte packet. Therefore, in accordance with step 46 in FIG. 3, the status flag of the next buffer 74 is examined to determine whether a packet may be written to that buffer. Status flag 93 indicates that a data packet may be written to the buffer 74. The 100 byte data packet is written to the next buffer 74, and in accordance with steps 49 and 50 of FIG. 3, the status flag 92 of the current buffer 91 is modified to indicate that a data packet may not be written to that buffer, and the buffer to which the data packet was written 74 becomes the current buffer 91. FIG. 8d reflects the status of the buffers after receipt of the forth data packet.

Figure 8E:
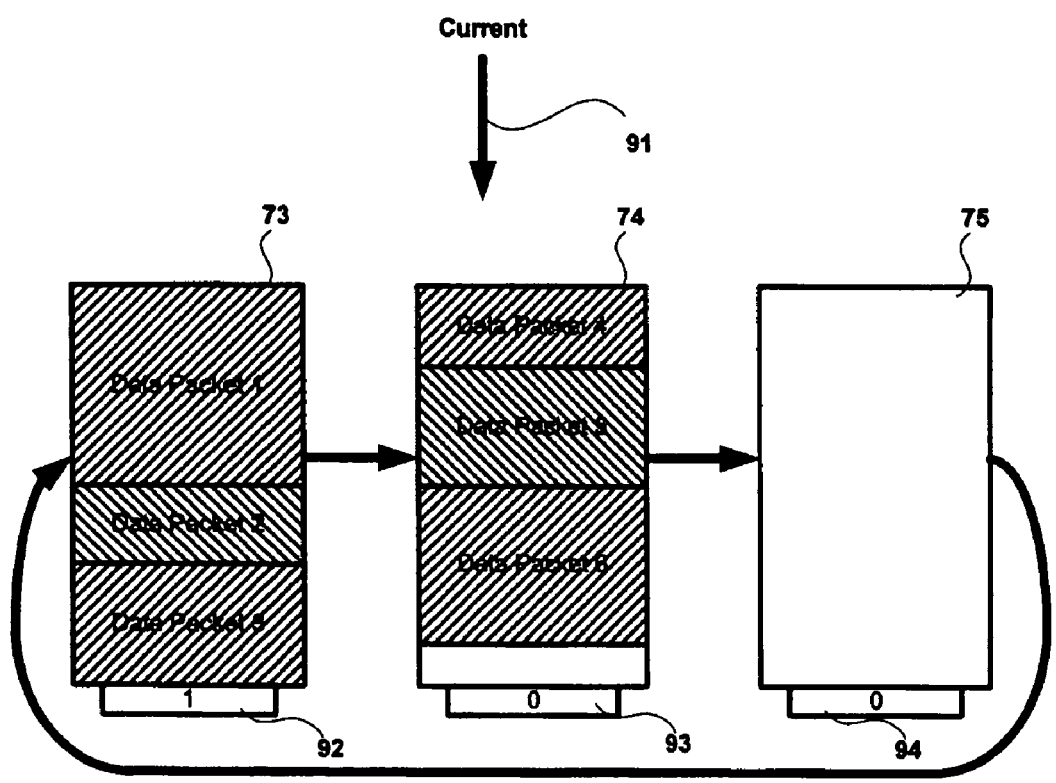

Data packets five and six are received, of sizes 150 and 200 bytes respectively. As there is sufficient space in the current buffer to accommodate these, they are stored in the current buffer as seen in FIG. 8e. There remains 50 bytes of available space in the current buffer 91.

Figure 8F:
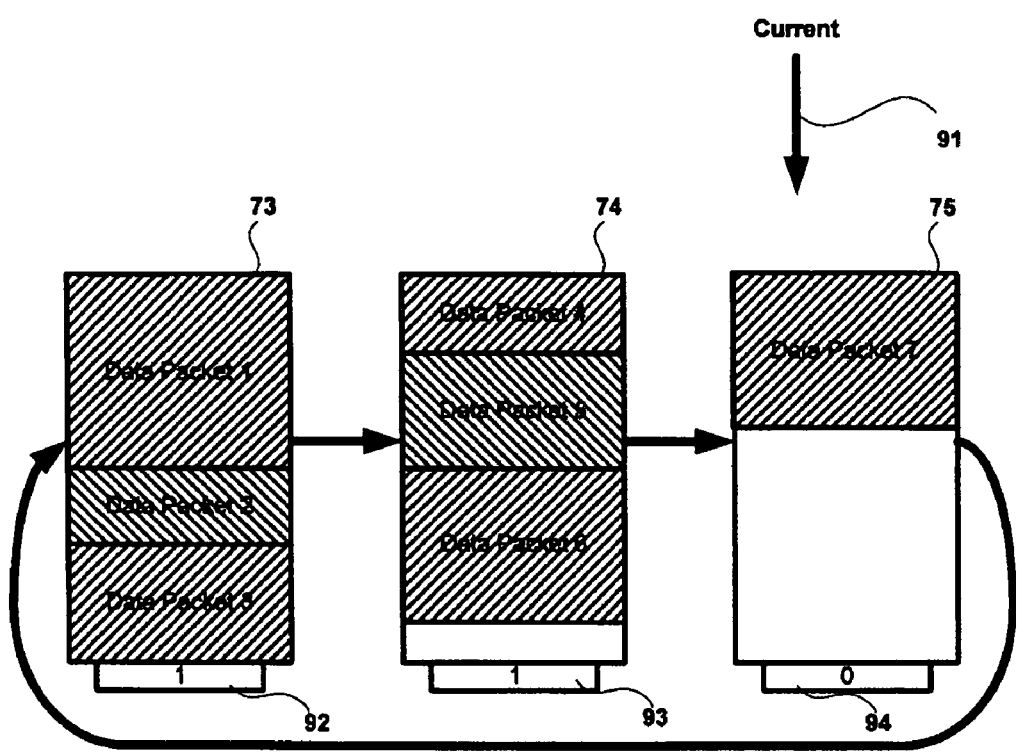

The seventh data packet to be received is of size 200 bytes. The available space in the current buffer is insufficient to accommodate this data packet. Therefore the status flag of the next buffer 75 is examined to determine whether a packet may be written to that buffer. Status flag 94 indicates that a data packet may be written to the buffer 75. The seventh data packet is written to buffer 75, the status flag of the current buffer 93 is modified to indicate that a data packet may not be written to that buffer, and the buffer to which the data packet was written 75 becomes the current buffer 91. FIG. 8f reflects the status of the buffers after receipt of the seventh data packet.

Figure 8G:
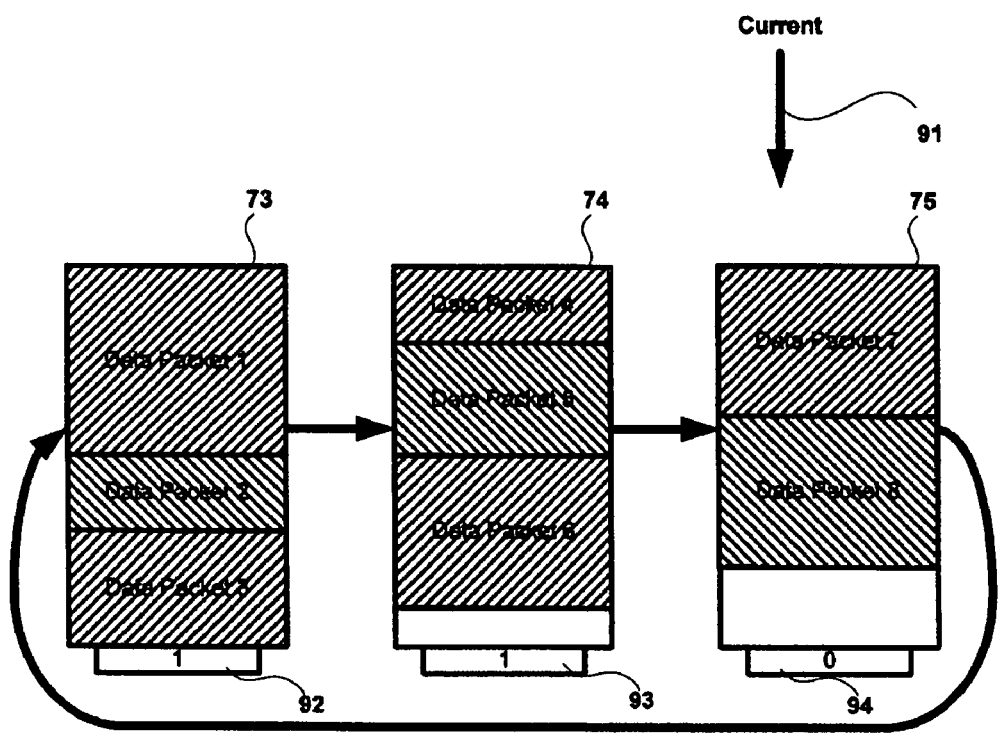

A data packet of size 200 bytes is the eighth data packet to arrive and is stored in the current buffer 91 as shown in FIG. 8g. The next data packet is packet nine and is 150 bytes. The current buffer has 100 bytes of available space which is insufficient to accommodate the 150 byte data packet. The treatment of data packet nine is dependent on whether the contents of the buffer 73 have been written to persistent memory. This latter task may occur concurrently with the storing of data packets in the buffers.

To this end, and referring to FIG. 8d, after data packet four arrived and it was discovered that it could not be accommodated in buffer 73, the status flag 92 of buffer 73 was modified to indicate that a data packet may not be written to that buffer. When the status flag of buffer 73 was modified, the tracing module woke up the kernel daemon 95 from its sleep state. The daemon examines the status flag 92 of the referenced buffer 97 and determines that the contents of the buffer are ready to be written to persistent memory. The contents will be so written and the reference buffer advanced to buffer 74. Once the daemon has written the contents to persistent memory, the status flag of the buffer is modified to indicate that a data packet may be written to that buffer.

The exact time at which the daemon writes the contents of a buffer to persistent memory following the modification of the status flag of the buffer to indicate that the contents can be so written, and the amount of time taken to perform the task of writing to persistent memory is difficult to precisely determine. It depends on several factors such as whether the daemon is bound to a dedicated computer processing unit, the time taken to schedule the processing unit and/or the time required by the computer hardware to store the data to persistent memory. Therefore it is possible that by the time the kernel daemon 95 advances its reference 97 to buffer 74 the status flag 93 for buffer 74 indicates that the contents of the buffer are ready to be written to persistent memory. In that case, the contents will be so written. Alternatively, if the status flag 93 indicates that this is not the case, the daemon 95 will enter a sleep state. At the time data packet nine is received it is possible that the content of buffer 73 is written to persistent memory. However, it is also possible that at the time data packet nine is received, the daemon is in the process of writing the contents of buffer 73 to persistent memory, but the process has not yet been completed.

Figure 9A:
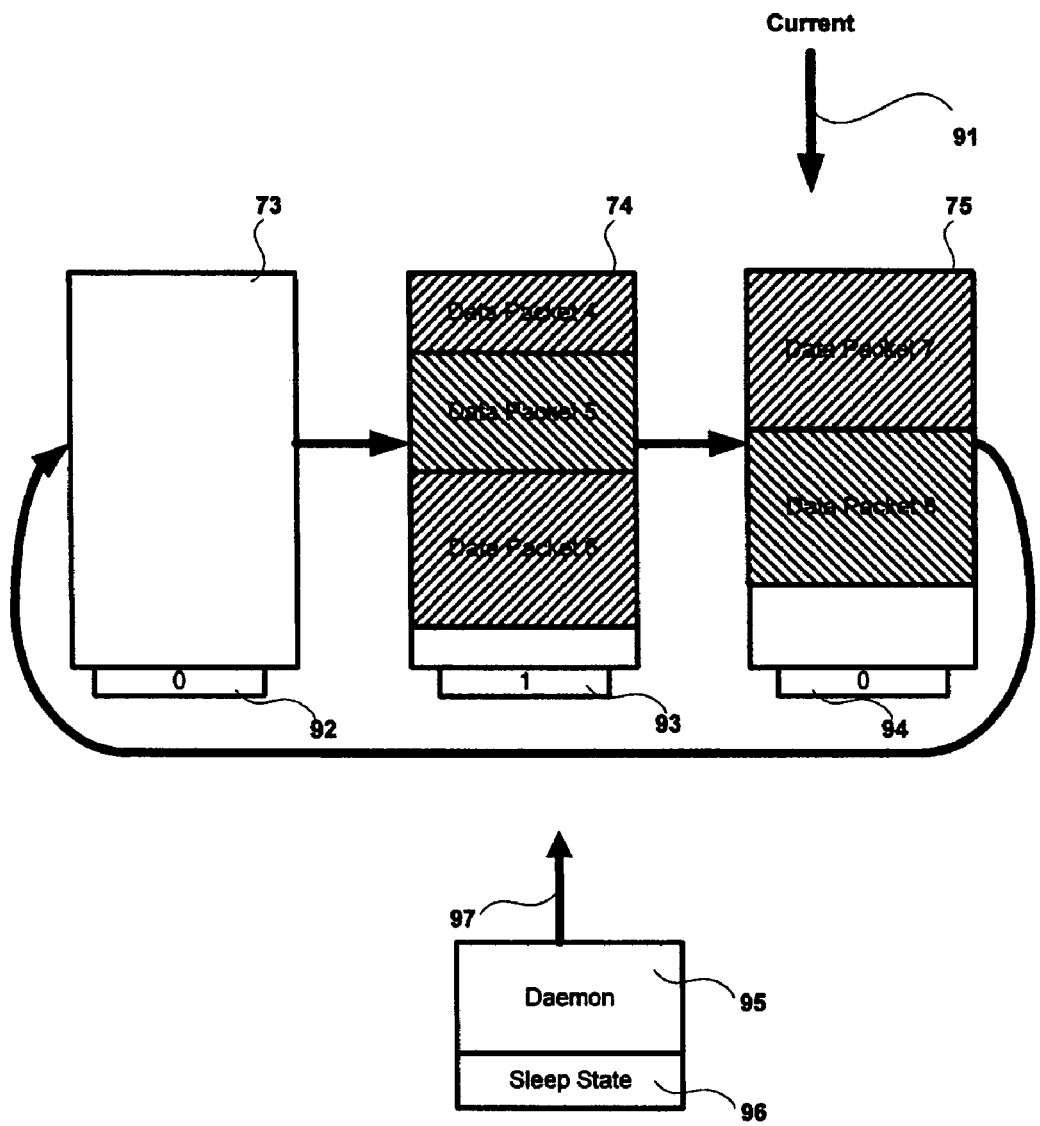
Figure 9B:
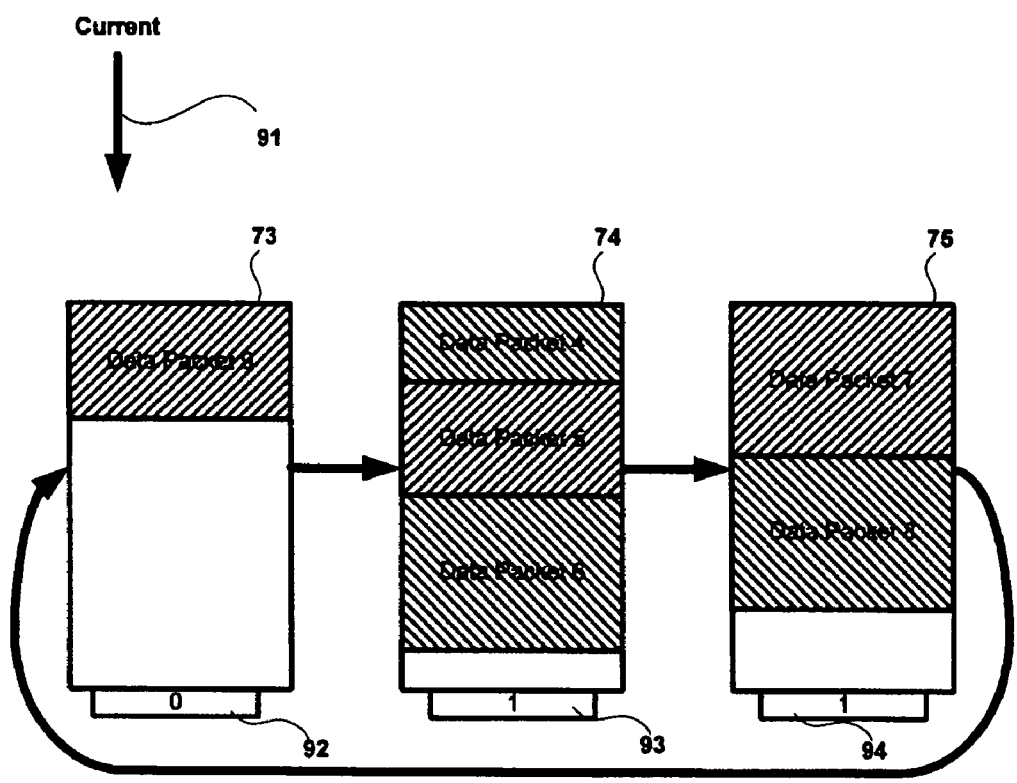

If the contents of buffer 73 have been written to persistent memory before data packet nine is received, the status of the buffers will be as shown in FIG. 9a. There is no data held in buffer 73 and the status flag 92 shows that a data packet may be written to the buffer. In this case, data packet nine will be written to buffer 73, the status flag 94 of the current buffer 91 will be modified to indicate that a data packet may not be written to buffer 75, and buffer 73 will become the current buffer, as shown in FIG. 9b.

The kernel daemon 95 will be in a wake state and be in the process of writing the contents of buffer 74 to persistent memory. After completing that process, the reference 97 will advance to buffer 75 and as the status flag 94 of buffer 75 indicates that the contents are ready to be written to memory, the daemon will proceed to so write the contents. The contents of the buffers will be written to persistent memory regardless of the available space remaining in these buffers. As demonstrated, if the status flag of more than one buffer indicates that for each of the more than one buffers a data packet may not be written to that buffer, the contents of each of the buffers will be written to persistent computer memory in an order following the predefined sequence from the contents of the buffer to which a data packet was least recently written to the contents of the buffer to which a data packet was most recently written.

Figure 10:
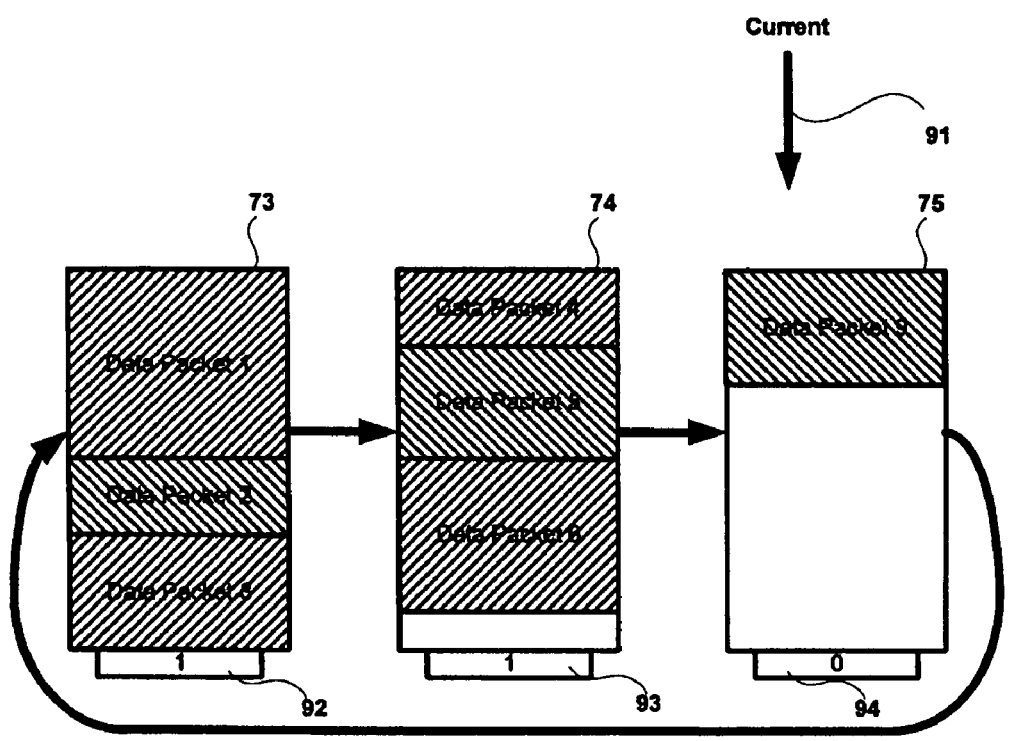

Alternatively, if the contents of buffer 73 have not been written to persistent memory before data packet nine is received, the status of the buffers will be as shown in FIG. 8g. In this case the contents of the current buffer 91 will be overwritten, and data packet nine will be written to the current buffer 91 as shown in FIG. 10. The contents of the current buffer will continually be overwritten each time the available space in the current buffer is insufficient to accommodate an incoming data packet until the contents of buffer 73 are written to persistent memory and the status flag 92 of buffer 73 is modified to indicate that a data packet may be written to that buffer.

Figure 11:
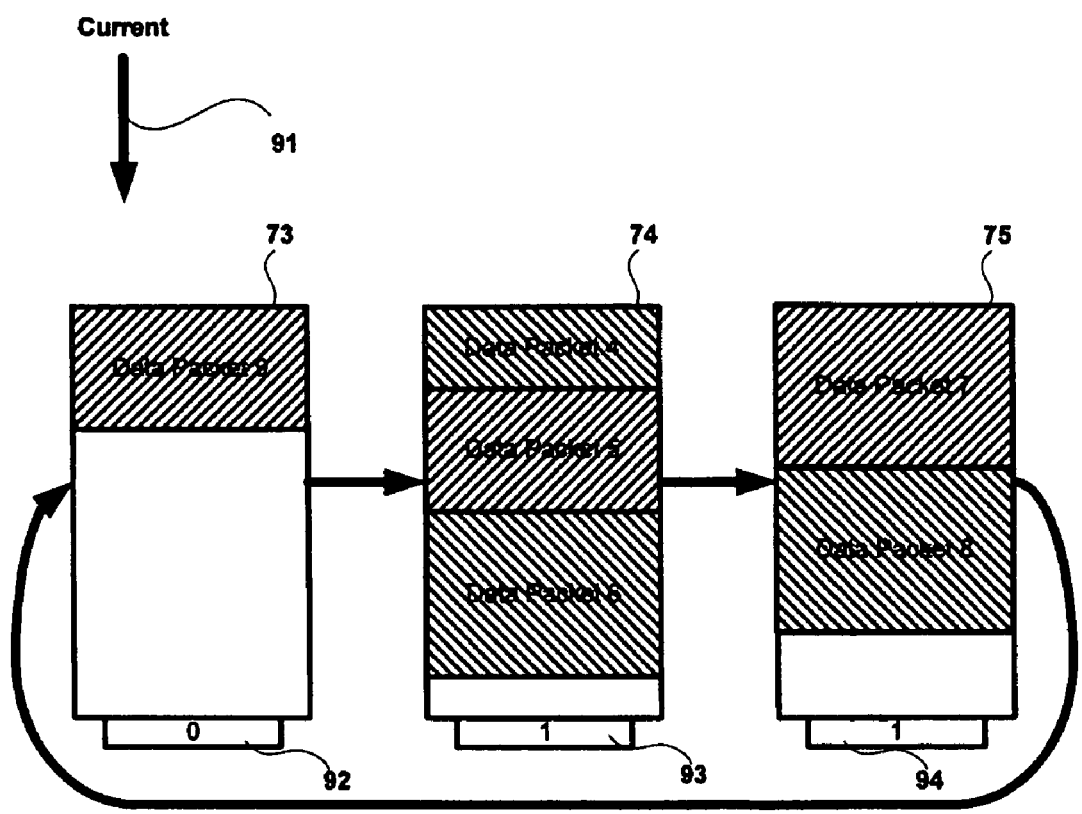
FIG. 11: shows an example illustrating a variation of the invention.

When the ninth packet of size 150 bytes arrives, the available space in the current buffer 91 is 100 bytes, which is insufficient to accommodate the incoming data packet. In this case the contents of buffer 73 will be overwritten and data packet nine will be written to buffer 73 in accordance with step 66 of FIG. 5. In accordance with steps 67 and 68 of FIG. 5 the status flag of the current buffer 91 is modified to indicate that a data packet may not be written to that buffer and buffer 73 becomes the current buffer 91 as shown in FIG. 11. The status flag of buffer 73 is set to indicate that this is the buffer to which data packets may be written.

This sequence of operations will continue such that when there is not sufficient space in buffer 73 to accommodate an incoming data packet, the data in buffer 74 will be overwritten, the incoming data packet will be placed in buffer 74, the status flag 92 of buffer 73 will be modified to indicate that data packets may not be written to that buffer and the status flag 93 of buffer 74 will be modified to indicate that data packets may be written to that buffer.

In the case of the embodiment of the invention concerned with writing the data to persistent memory in response to a watch event, this process continues until a watch event occurs. When a watch event occurs, the status flag of the current buffer is modified to indicate that a data packet may not be written to the buffer and the computer daemon writes to persistent memory the contents of all buffers for which the status flag of the buffer indicates that a data packet may not be written to that buffer. For example, with reference to FIG. 11, if a watch event were to occur after receipt of data packet nine, the status flag 92 of the current buffer 91 is modified to indicate that data packets may not be written to the buffer. As there is no buffer to which data packets may be written, no further data packets may be written to this set of buffers. The computer daemon would first write the contents of buffer 74 to persistent memory as this is the buffer which holds the oldest set of data. The computer daemon may then modify the status flag 93 of buffer 74 to indicate that a data packet may be written to that buffer, and will proceed to write the contents of buffer 75 to persistent memory. After the occurrence of a watch event, there are a variety of ways in which the packet tracing system can be caused to behave. These will depend on the specific requirements of the user of the system.

Thus the invention provides a method and apparatus for capturing data in a computer network. The invention is advantageous in that it is able to capture data from any network module in a protocol stack thereby providing data on the operation of the protocol stack independent to the operation of the network. The invention is also advantageous in that all computer modules operate within operating system kernel space. Thus the speed at which the data captured can be transferred to persistent memory is faster than a system which writes the data to persistent memory from user space memory. Due to the faster speed at which data is transferred to persistent memory there is a reduced risk that data will be lost. The invention is furthermore advantageous in that it is able to capture a snapshot of the data passing through the network. This enables a user of the system to capture only the data relevant to their needs rather than be forced to extract the required information from a large body of captured data.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

What we claim is:

1. A method of capturing data in a computer network comprising:
    (a) designating a plurality of areas of computer memory as buffers, wherein each of the plurality of buffers is associated with a status flag;
    (b) receiving a data packet;
    (c) receiving a second data packet;
    (d) writing the received data packets to a buffer;
    (e) modifying the status flag of the buffer in dependence on the contents of the buffer, wherein the status flag of each buffer indicates whether a received data packet may be written to that buffer;
    (f) monitoring the status flag of the buffer, wherein the status flag of each buffer is monitored by a computer operating system kernel daemon, wherein the computer operating system kernel daemon is alerted when the status flag of a buffer is modified to indicate that a data packet may not be written to that buffer; and
    (g) writing the contents of the buffer to persistent computer memory in dependence on the status flag of the buffer, in dependence on a request, or in dependence on a special event.

2. The method as claimed in claim 1 wherein each buffer is associated with a single status flag.

3. The method as claimed in claim 1 wherein each designated area of computer memory to be used as a buffer is contiguous.

4. The method as claimed in claim 1 wherein each designated area of computer memory to be used as a buffer is contained in an area of computer memory reserved for use by the operating system of a computer.

5. The method as claimed in claim 1 wherein the total size of the plurality of areas of computer memory is adjusted by a computer in dependence on the rate of receipt of data packets.

6. The method as claimed in claim 1 wherein more than one data packet is written to a single buffer.

7. The method as claimed in claim 1 wherein the data packet received in step (b) can be received from any computer network module.

8. The method as claimed in claim 1 including the step of modifying the status flag of a buffer after the contents of that buffer have been written to persistent computer memory.

9. The method as claimed in claim 1 wherein step (g) uses data striping.

10. The method as claimed in claim 1 wherein step (d) is performed by a computer module which is part of a computer operating system kernel.

11. The method as claimed in claim 1 wherein step (g) is performed by a computer operating system kernel daemon.

12. The method as claimed in claim 1 wherein step (g) occurs when the status flag of a buffer indicates that a data packet may not be written to that buffer.

13. The method as claimed in claim 1 wherein one buffer of the plurality of buffers is designated as the current buffer.

14. The method as claimed in claim 13 wherein after receiving a data packet in step (b) the space available in the current buffer is examined to determine whether it is sufficient to accommodate the data packet received.

15. The method as claimed in claim 14 wherein if the space available in the current buffer is sufficient to accommodate the data packet received, the data packet received is written to the current buffer.

16. The method as claimed in claim 14 wherein the plurality of buffers form a predefined sequence of buffers and if the space available in the current buffer is not sufficient to accommodate the data packet received, the data packet is written to the next buffer.

17. The method as claimed in claim 14 wherein the plurality of buffers form a predefined sequence of buffers, and if the space available in the current buffer is not sufficient to accommodate the data packet received, the status flag of the next buffer in the predefined sequence is examined to determine whether the status flag of the buffer indicates that a data packet may be written to the buffer.

18. The method as claimed in claim 17 wherein if the status flag of the next buffer indicates that a data packet may be written to that buffer, the data packet received is written to that buffer.

19. The method as claimed in claim 18 wherein the status flag of the current buffer is modified to indicate that a data packet may not be written to that buffer.

20. The method as claimed in claim 19 wherein the next buffer becomes the current buffer.

21. The method as claimed in claim 17 wherein if the status flag of the buffer after the current buffer in the predefined sequence indicates that a data packet may not be written to that buffer the data packet is written to the current buffer.

22. The method as claimed in claim 1 wherein the plurality of buffers form a predefined sequence of buffers, and if the status flag of more than one buffer indicates that for each of the more than one buffers a data packet may not be written to that buffer, the contents of each of the buffers will be written to persistent computer memory in an order following the predefined sequence from the contents of the buffer to which a data packet was least recently written to the contents of the buffer to which a data packet was most recently written.

23. The method as claimed in claim 1 wherein step (g) comprises writing the contents of a buffer to persistent computer memory in dependence on the status flag of the buffer and in dependence on a request.

24. The method as claimed in claim 1 wherein step (g) comprises writing the contents of a buffer to persistent computer memory in dependence on the status flag of the buffer and in dependence on a special event.

25. The method as claimed in claim 24 wherein the special event is related to the nature of a data packet received.

26. The method as claimed in claim 24 wherein the special event is related to a state of the connection to a computer network.

27. The method as claimed in claim 24 wherein the special event is related to the state of the networking system.

28. A machine-readable storage medium storing a set on instructions that, when executed by a machine, cause of the machine to perform the method of claim 1.

29. An apparatus for capturing data in a computer network including:
(a) dynamic memory having a plurality of areas of memory defining a plurality of buffers, wherein each buffer is associated with a status flag, and wherein the status flag of each buffer indicates whether a received data packet may be written to that buffer;
(b) persistent memory;
(c) a data processor for:
(i) receiving a plurality of data packets;
(ii) writing the plurality of data packets to a buffer,
(iii) modifying the status flag of the buffer in dependence on the contents of the buffer; and
(iv) monitoring the status flag of the buffer, wherein the data processor performs the function of alerting the computer daemon when the status flag of a buffer is modified to indicate that a data packet may not be written to that buffer; and
(d) the computer daemon controlling the data processor to write the contents of the buffer to the persistent memory in dependence on the status flag of the buffer, in dependence on a request, or in dependence on a special event, and wherein the data processor performs the function of writing the contents of the buffer to the persistent memory when the status flag of the buffer indicates that a data packet may not be written to that buffer.

30. The apparatus as claimed in claim 29 wherein the data processor consists of more than one processing unit.

31. The apparatus as claimed in claim 30 wherein the computer daemon is bound to a first processing unit.

32. The apparatus as claimed in claim 31 wherein the first processing unit is not otherwise used for processing network traffic.

33. The apparatus as claimed in claim 29 wherein each area of memory defining a buffer is contiguous.

34. The apparatus as claimed in claim 29 wherein each area of memory defining a buffer is contained in an area of computer memory reserved for use by an operating system of a computer.

35. The apparatus as claimed in claim 29 wherein more than one data packet is written to each area of memory defining a buffer.

36. The apparatus as claimed in claim 29 wherein the data processor can receive a data packet from any computer network module.

37. The apparatus as claimed in claim 29 wherein the dynamic memory maintains a reference to a designated buffer.

38. The apparatus as claimed in claim 37 wherein after the data processor receives a data packet the data processor performs the function of examining the space available in the designated buffer to determine whether it is sufficient to accommodate the data packet received.

39. The apparatus as claimed in claim 38 wherein if the space available in the designated buffer is sufficient to accommodate the data packet received, the data processor performs the function of writing the data packet received to the designated buffer.

40. The apparatus as claimed in claim 38 wherein if the space available in the designated buffer is not sufficient to accommodate the data packet received, the data processor performs the function of examining the status flag of the next buffer in a predefined sequence of buffers.

41. The apparatus as claimed in claim 40 wherein if the status flag of the buffer after the designated buffer in the predefined sequence indicates that a data packet may be written to the buffer the data processor performs the function of writing the data packet to the buffer.

42. The apparatus as claimed in claim 41 wherein the data processor performs the function of modifying the status flag of the designated buffer to indicate that a data packet may not be written to that buffer.

43. The apparatus as claimed in claim 42 wherein the data processor performs the function of modifying the reference in the dynamic memory to designate the next buffer in the predefined sequence.

44. The apparatus as claimed in claim 40 wherein if the status flag of the buffer after the designated buffer in the predefined sequence indicates that a data packet may not be written to that buffer the data processor performs the function of writing the data packet to the designated buffer.

45. The apparatus as claimed in claim 29 wherein the data processor performs the function of modifying the status flag of a buffer when the contents of the buffer is written to persistent computer memory.

46. The apparatus as claimed in claim 29 wherein if the status flag of more than one buffer indicates that for each of the more than one buffers a data packet may not be written to that buffer the data processor performs the function of writing the contents of each of the buffers to persistent computer memory in the order of the contents of the buffer to which a data packet was least recently written to the contents of the buffer to which a data packet was most recently written.

47. The apparatus as claimed in claim 29 wherein the computer daemon controls the data processor to write the contents of a buffer to the persistent memory in dependence on the status flag of the buffer and in dependence on a request.

48. The apparatus as claimed in claim 29 wherein the computer daemon controls the data processor to write the contents of a buffer to the persistent memory in dependence on the status flag of the buffer and in dependence on a special event.

49. The apparatus as claimed in claim 48 wherein the special event is related to the nature of a data packet received.

50. The apparatus as claimed in claim 48 wherein the special event is related to a state of the connection to the computer network.

51. The apparatus as claimed in claim 48 wherein the special event is related to the state of a networking system.

52. A method of capturing data in a computer network including the steps of: (a) designating in a dynamic memory having a plurality of areas of memory defining a plurality of buffers, wherein each buffer is associated with a status flag, and wherein the status flag of each buffer indicates whether a received data packet may be written to that buffer; (b) receiving a data packet; (c) writing the received data packet to a buffer; (d) modifying the status flag of the buffer in dependence on the contents of the buffer, wherein the status flag of each buffer indicates whether a received data packet may be written to that buffer; (e) monitoring the status flag of the buffer, wherein the status flag of each buffer is monitored by a computer operating system kernel daemon, wherein the computer operating system kernel daemon is alerted when the status flag of a buffer is modified to indicate that a data packet may not be written to that buffer; and (f) writing the contents of the buffer to persistent computer memory in dependence on the status flag of the buffer, in dependence on a request, or in dependence on a special event.

\* \* \* \* \*